United States Patent
Gong

(10) Patent No.: US 8,255,680 B1
(45) Date of Patent: Aug. 28, 2012

(54) LAYER-INDEPENDENT SECURITY FOR COMMUNICATION CHANNELS

(75) Inventor: Li Gong, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 08/883,636

(22) Filed: Jun. 26, 1997

(51) Int. Cl.
*H04L 29/06* (2006.01)

(52) U.S. Cl. .......... 713/153; 713/151; 713/152; 380/37; 380/42; 726/3

(58) Field of Classification Search .............. 380/49, 380/37, 42, 9; 395/200.61, 200.6, 200.59, 395/200.49; 713/151, 152, 153; 726/3
See application file for complete search history.

(56) References Cited

U.S. PATENT DOCUMENTS

| | | | |
|---|---|---|---|
| 5,179,591 A * | 1/1993 | Hardy et al. ............ | 713/171 |
| 5,311,593 A * | 5/1994 | Carmi ..................... | 380/23 |
| 5,319,712 A | 6/1994 | Finkelstein et al. ...... | 380/44 |
| 5,414,833 A * | 5/1995 | Hershey et al. .......... | 713/201 |
| 5,416,842 A | 5/1995 | Aziz ....................... | 380/30 |
| 5,442,708 A * | 8/1995 | Adams, Jr. et al. ....... | 380/49 |
| 5,481,735 A | 1/1996 | Mortensen et al. ....... | 395/200.1 |
| 5,583,940 A * | 12/1996 | Vidrascu et al. .......... | 380/49 |
| 5,588,060 A | 12/1996 | Aziz ....................... | 380/30 |
| 5,604,803 A | 2/1997 | Aziz ....................... | 320/25 |
| 5,657,390 A * | 8/1997 | Elgamal et al. ........... | 380/49 |
| 5,668,880 A * | 9/1997 | Alajajian ................. | 380/49 |
| 5,671,279 A * | 9/1997 | Elgamal .................. | 380/23 |
| 5,689,565 A * | 11/1997 | Spies et al. ............... | 713/189 |
| 5,689,566 A * | 11/1997 | Nguyen ................... | 380/25 |
| 5,761,421 A * | 6/1998 | Van Hoff et al. ......... | 395/200.53 |
| 5,784,461 A * | 7/1998 | Shaffer et al. ............ | 380/21 |
| 5,793,749 A * | 8/1998 | Helwig et al. ............ | 370/241 |
| 5,793,958 A | 8/1998 | Clement et al. .......... | 395/200.5 |
| 5,825,890 A * | 10/1998 | Elgamal et al. ........... | 713/151 |
| 5,838,927 A * | 11/1998 | Gillon et al. ............. | 395/200.77 |

(Continued)

FOREIGN PATENT DOCUMENTS

DE    44 08 035    9/1995

(Continued)

OTHER PUBLICATIONS

Schneier, Bruce, Applied Cryptography, 1996, pp. 197-198.*

(Continued)

*Primary Examiner* — Eleni Shiferaw
*Assistant Examiner* — Paul Callahan
(74) *Attorney, Agent, or Firm* — Marsh Fischmann & Breyfogle, LLP; Jonathan A. Szumny; Kent A. Lembke

(57) ABSTRACT

A method and apparatus for providing layer-independent secure network communication is provided. According to an embodiment of the invention, a transmission medium is provided between a first network node and a second network node. Both the first network node and the second network node support at least one common communication protocol. A Java output stream is established between a first process executing on the first network node and the transmission medium. Also, a Java input stream is established between a second process executing on the second multi-layered node and the transmission medium. Data to be transmitted from the first process to the second process is encrypted by the first process and written to the Java output stream. The data is transmitted to the second network node. Then the data is read from the Java input stream by the second process and decrypted.

20 Claims, 6 Drawing Sheets

U.S. PATENT DOCUMENTS 6,061,448 A * 5/2000 Smith et al. .................... 380/21
6,065,108 A * 5/2000 Tremblay et al. ............. 712/201

FOREIGN PATENT DOCUMENTS

| | | |
|---|---|---|
| EP | 0776112 A2 | 5/1997 |
| EP | 0778512 A2 | 6/1997 |
| NZ | 270543 | 6/1994 |
| WO | WO 95/13676 | 8/1995 |
| WO | WO 95/25396 | 9/1995 |

OTHER PUBLICATIONS

Ashar Aziz, "Simple Key-Management for Internet Protocols (SKIP)," (IPSEC Working Group, Aug. 14, 1996).

Zuquette, et al., *"Transparent Authentication and Confidentiality for Stream Sockets,"* IEEE Micro, vol. 16, No. 3, Jun. 1, 1996, pp. 34-41, XP000594076.

* cited by examiner

LAYER-INDEPENDENT SECURITY FOR COMMUNICATION CHANNELS

FIELD OF THE INVENTION

The invention relates to data security, and more specifically, to a method and apparatus for providing layer-independent security in network communications.

BACKGROUND OF THE INVENTION

Some communication networks, particularly complex ones, support multiple communication protocols or "layers." Each layer specifies some functionality or "service" of the network and interacts with the layers immediately above and below, using services of the layer immediately below, while providing services to the layer immediately above. The lowest layer in a communication network typically governs direct communication between the hardware at different network nodes, while the highest layer handles direct communication with application programs executing on the network nodes.

The layered approach to implementing communication networks simplifies the creation and modification of complex communication architectures by providing for incremental changes on a layer-by-layer basis, which are transparent to other layers in the architecture. Two examples of layered communication protocols are the Transmission Control Protocol/Internet Protocol (TCP/IP), which has five layers, and the International Standards Organization's (ISO) Open Systems Interconnection (OSI) Reference Model (RM), which has seven layers.

The proliferation of communication networks and increased frequency of security breaches has underscored the importance of providing secure network communications. Many communication networks depend upon a secure communication connection or "channel" to maintain security. In the context of secure communication networks, a secure communication channel is a connection which provides for the encryption, authentication or otherwise secure transmission of data between network nodes.

Sometimes, setup negotiation is used to establish security for a communication channel. In the context of network communications, setup negotiation refers to specifying and agreeing to the details about security for a communication channel, such as the details of a particular encryption scheme to be used. Once setup negotiation is complete, all communication during the session conforms to the agreed upon security protocol, which provides secure communication.

Setup negotiation is an effective tool for providing secure communication during a communication session. However, when the amount of information included in each session is small, for example when a session contains only a single message, then the overhead attributable to setup negotiation can adversely affect communication performance. Moreover, some communication architectures do not include a session layer, which requires that a session layer be added to support session type security, further degrading performance.

Another approach for providing a secure communication channel involves encrypting or encoding data at a specific layer on a transmitting network node and then decrypting or decoding the data at a corresponding layer on a destination network node. Encrypting data at a specific layer typically involves applying an encryption algorithm based upon the format of data at a particular layer. Header data added by higher layers is also encrypted. Layer-specific encryption is particularly useful in datagram-based or packet-based networks which are typically sessionless and encapsulate data in datagram packets or some other type of data packet. For example, header data may be added to a data packet so that the data packet conforms to a particular format. This approach also provides for multiple encryptions to be performed at different layers.

Although layer-specific encryption can provide a secure communication channel while avoiding the overhead penalty associated with setup negotiation, it does have several limitations. First, all encryption and decryption must occur at the same corresponding layer on both the transmitting and receiving network nodes, according to the specific protocol supported by that layer. For example, Simple Key Management for Internet Protocols (SKIP) is designed to be used with internet protocol packets at the network layer, which requires internet layer specific function calls. On the other hand, Netscape Communications Corporation's Secure Sockets Layer (SSL) is designed to be used at the (Unix) socket layer and requires socket layer-specific function calls to encrypt and decrypt data. The result is that one application implementing security according to SKIP cannot interact with another application implementing security according to SSL.

In addition, layer-specific encryption can be difficult to employ in object-oriented environments because of the inherent level of abstraction required. For example, some layers operate on data bytes, which often is a much lower level than objects in an object oriented environment.

In view of both the need to provide secure communication channels and the limitations in the prior approaches, an approach for providing a secure communication channel which does not rely upon layer-specific encryption and which does not require setup negotiation is highly desirable.

SUMMARY OF THE INVENTION

According to one aspect of the invention, a method provides communication protocol-independent security for data transmitted between a first process, executing on a first network node, and a second process, executing on a second network node. Both the first network node and the second network node each support at least one common communication protocol. According to the method, a communication channel is established between the first network node and the second network node. Then, a first stream is established between the first process and the communication channel.

In the context of the invention, a "stream" is an abstraction which refers to the transfer or "flow" of data, in any format, from a single source, to a single destination. A stream typically flows through a channel or connection between the sender and receiver, in contrast to data packets, which are typically individually addressed and which may be routed independently to multiple recipients. Hence, an application can write data to, or read data from, a stream without knowing the actual destination or source, respectively, of the data.

After the first stream is established between the first process and the communication channel, a second stream is established between the second process and the communication channel. Data to be transmitted between the first and second processes is encrypted. The encryption of the data is independent of the communication protocol supported by the first network node. The encrypted data is then written to the first stream which causes the encrypted data to be transmitted from the first network node to the second network node. The encrypted data is read from the second stream and then decrypted to obtain decrypted data which is identical to the data on the first network node before the data was encrypted.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing layer-independent secure communications in a multi-layered communication network is described. In the following description, for the purposes of explanation, numerous specific details are set forth in order to provide a thorough understanding of the invention. However, the invention may be practiced without these specific details. In other instances, well-known structures and devices are illustrated in block diagram form in order to avoid unnecessarily obscuring the invention.

Functional Overview

The invention provides a method and apparatus for providing layer-independent secure communications in a multi-layered communication network. In general, a communication channel or connection is first established between a first multi-layered network node and a second multi-layered network node. Then, a first stream is established between a first process, executing on the first multi-layered network node, and the communication channel. A second stream is then established between a second process, executing on the second multi-layered network node and the communication channel. Then, the first process performs a layer-independent encryption of data to be transmitted between the first and second multi-layered network nodes and then writes the encrypted data to the first stream, which causes the encrypted data to be transmitted to the second multi-layered network node. Then, the encrypted data is read by the second process from the second stream and decrypted so that the decrypted data is identical to the data on the first multi-layered network node prior to being encrypted.

Figure 1:
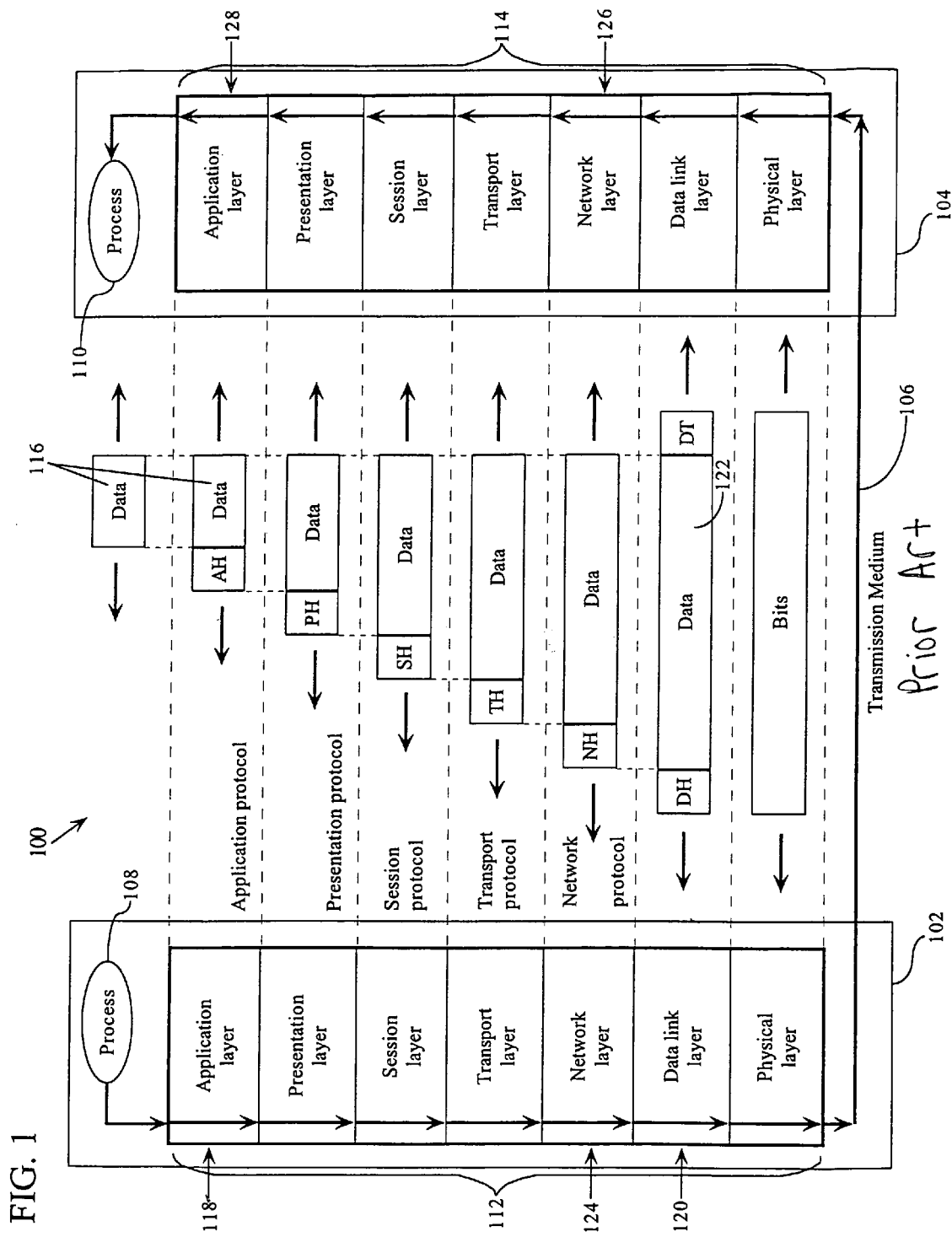
FIG. 1 is a block diagram of an exemplary prior art multi-layered communication network which can be used in implementing an embodiment of the invention.

FIG. 1 illustrates an example of prior art multi-layered communication network 100 to which the invention is applicable. In general, multi-layered communication network 100 includes multi-layered nodes 102, 104, communicatively coupled by transmission medium 106. Although multi-layered communication network 100 may resemble the International Standards Organization (ISO) Open Systems Interconnection (OSI) Reference Model (RM), the invention is applicable to any multi-layered communication network.

A process 108 executes on multi-layered node 102 while a process 110 executes on multi-layered node 104. Multi-layered node 102 supports a multi-layered communication hierarchy 112, where each identified layer supports a particular communication protocol. Each layer in hierarchy 112 offers certain services to the higher layers while shielding the higher layers from the details of how those services are actually implemented. Multi-layered node 104 also supports a multi-layered communication hierarchy 114, which includes layer corresponding to the layers in hierarchy 112. All data transmitted from process 108 to transmission medium 106 conforms to all communication protocols supported by hierarchy 112.

For example, to transmit data 116 from process 108 to transmission medium 106, data 116 must first conform to an application protocol specified by application layer 118 on multi-layered node 102. According to one embodiment of the invention, this requires that data 116 be formatted according to application layer 118 protocol and that an application protocol header AH be appended to the front end of data 116 which specifies the format of data 116.

This process is repeated for each layer in hierarchy 112. According to one embodiment of the invention, the formatting of data 116 according to a data link layer 120 involves the addition of both a header portion DH and a trailer portion DT to a data portion 122. It should be noted that data link layer 120 is not aware of which portion of data portion 122 corresponds to data 116 and which portion represents formatting information of higher layers. Data link layer 120 formats the entire data portion 122 without regard to which portion may be "real" data 116 and which portion is formatting information added by higher layers in hierarchy 112.

When messages are received by multi-layered node 104 from transmission medium 106, a reverse process occurs. Since messages must conform to application layer protocol before being processed by process 110, any formatting information attributable to layers below application layer 128 must be removed.

As previously discussed, one approach for providing secure communication between process 108 and process 110 is to have processes 108, 110 perform setup negotiation prior to transmitting data. However, this approach can adversely affect data throughput, particularly when the setup negotiation is performed on a packet-by-packet basis.

Another previously discussed approach is to encrypt the data at one of the layers in hierarchy 112 on multi-layered node 102 before transmitting the data on transmission medium 106. Then, after the encrypted data is received on node 104, the data is decrypted at the corresponding layer in hierarchy 114 on multi-layered node 104 before the data is received by process 110. For example, data may be encrypted at the network layer 124 on multi-layered node 102 and then decrypted at network layer 126 on multi-layered node 104 on a packet-by-packet basis. Although this approach is robust from a security standpoint, the data must be decrypted at the same layer at which the data was encrypted.

Layer-Independent Security

Figure 2:
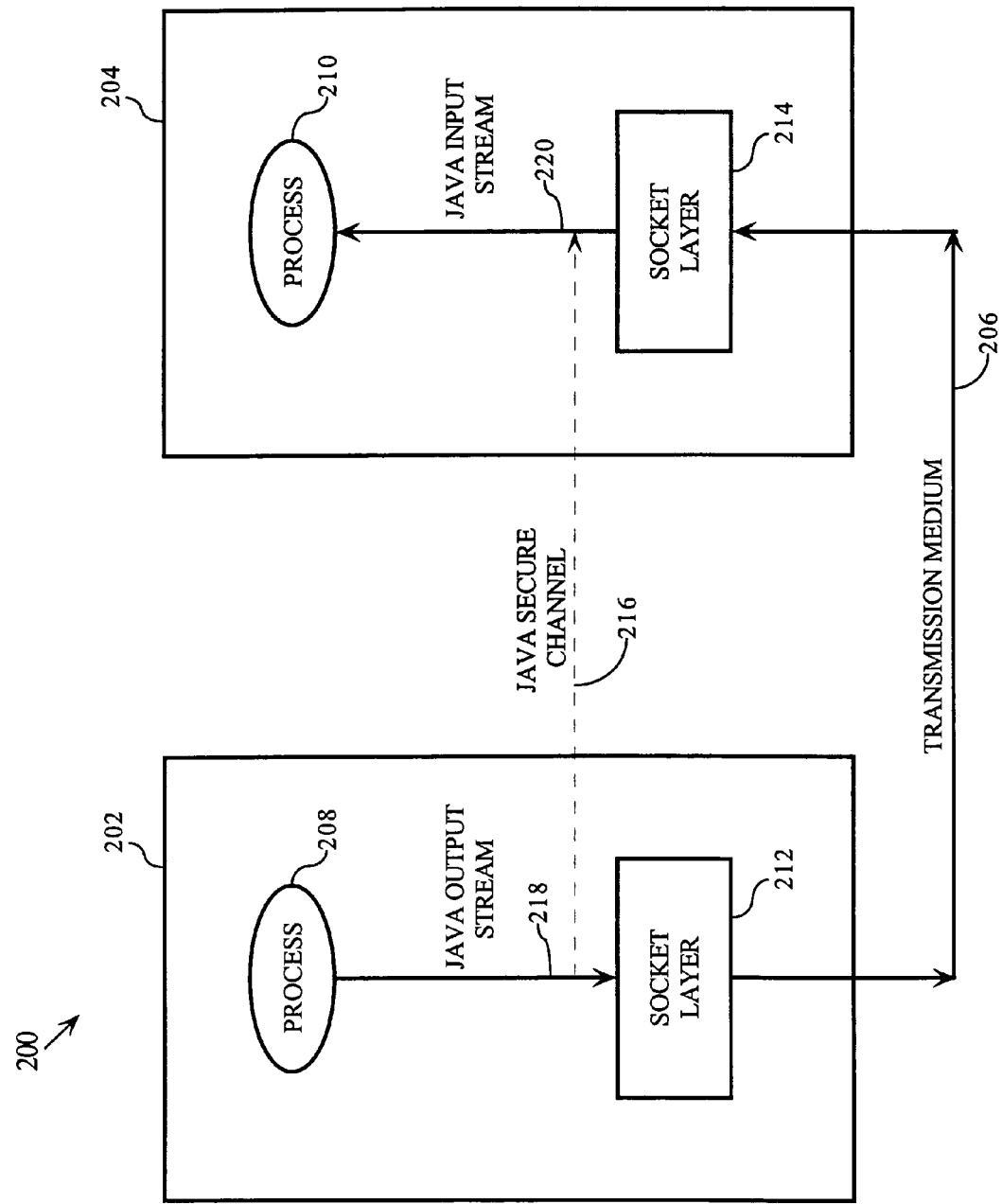
FIG. 2 is a block diagram of a multi-layered communication network according to another embodiment of the invention.

An approach which provides layer-independent secure network communication in a multi-layered communication network according to an embodiment of the invention is illustrated by the block diagram of FIG. 2. A multi-layered communication network 200 includes multi-layered nodes 202, 204 which are communicatively coupled by a transmission medium 206. A process 208 executes on multi-layered node 202 while a process 210 executes on multi-layered node 204.

Multi-layered nodes 202, 204 each support one or more communication layers (protocols) including socket layers 212, 214, respectively. Socket layers 212, 214 provide an interface between processes 208, 210, respectively, and transmission medium 206. Multi-layered nodes 202, 204 may support addition layers (not illustrated) both above and below socket layers 212, 214. Accordingly, socket layers 212, 214 each include sockets (not illustrated), which are end points similar to an OSI Transport Service Access Point (TSAP), and which provide a connection between layers above and below socket layers 212, 214. In addition, a Java secure channel 216 is provided between node 202 and node 204. Java security channel 216 provides for the layer-independent encryption of high level data constructs such as objects.

Generally, according to an embodiment of the invention, layer-independent security for communications between process 208 and process 210 is provided by process 208 encrypting data which is then written to a Java output stream 218. A Java stream is a stream which provides for the transfer of low level data constructs, such as bytes, as well as high level data constructs, such as serialized objects, between a source and a destination. The data is then conformed to a socket layer protocol by socket layer 212 and written to transmission medium 206. The data is then processed according to socket layer protocol by socket layer 214 and read from a Java input stream 220 by process 210 and finally decrypted by process 210.

Encryption of stream data according to embodiments of the invention is by definition layer-independent and provides a level of abstractness which is compatible with many abstract processes and languages which support streams, such as object oriented languages. Besides the layer-independent data encryption performed by process 208, additional (layer-dependent) encryption may be provided at any layer in node 202, with decryption being performed at the corresponding peer layer in node 204.

Figure 3:
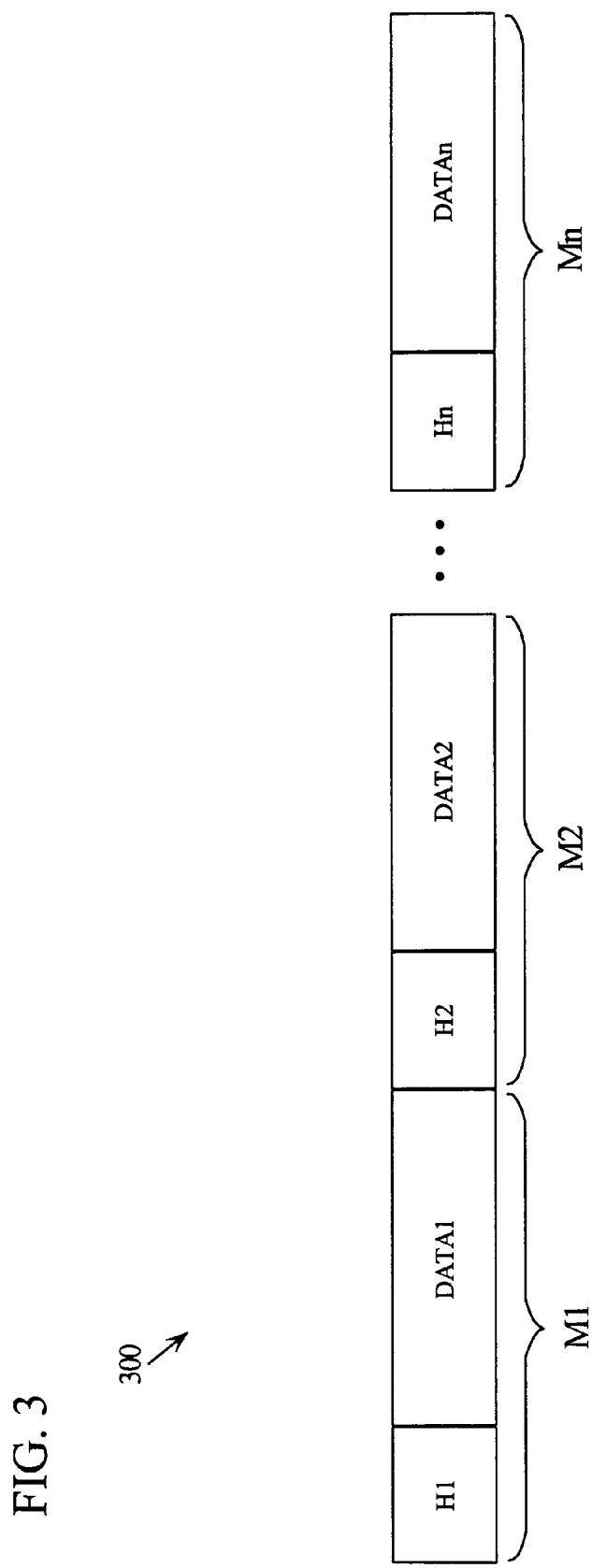
FIG. 3 illustrates a stream format according to an embodiment of the invention.

The data format of object output stream 218 and object input stream 220 is illustrated in FIG. 3. Generally, stream format 300 is an abstract message format which is self-contained and layer-independent. Stream format 300 includes 1 to N variable length messages (M1, M2 . . . Mn). Each message (M1, M2 . . . Mn) includes a header portion (H1, H2 . . . Hn) and a data portion (DATA1, DATA2 . . . DATAn). According to one embodiment of the invention, each header portion (H1, H2 . . . Hn) specifies the length of the associated data portion (D1, D2 . . . Dn) and also includes encryption key/authentication information which eliminates the need for setup negotiation. However, certain encryption key/authentication information is established once during system setup so that recipients of the messages (M1, M2 . . . Mn) can decrypt data contained in the data portion (D1, D2 . . . Dn) of each message (M1, M2 . . . Mn).

The flexibility of stream format 300 of the invention provides for the implementation of various encryption/authentication approaches and is not limited to the particular encryption/authentication approach described herein. In addition, since stream format 300 is layer independent, various data formats may be employed without departing from the scope of the invention.

Figure 4:
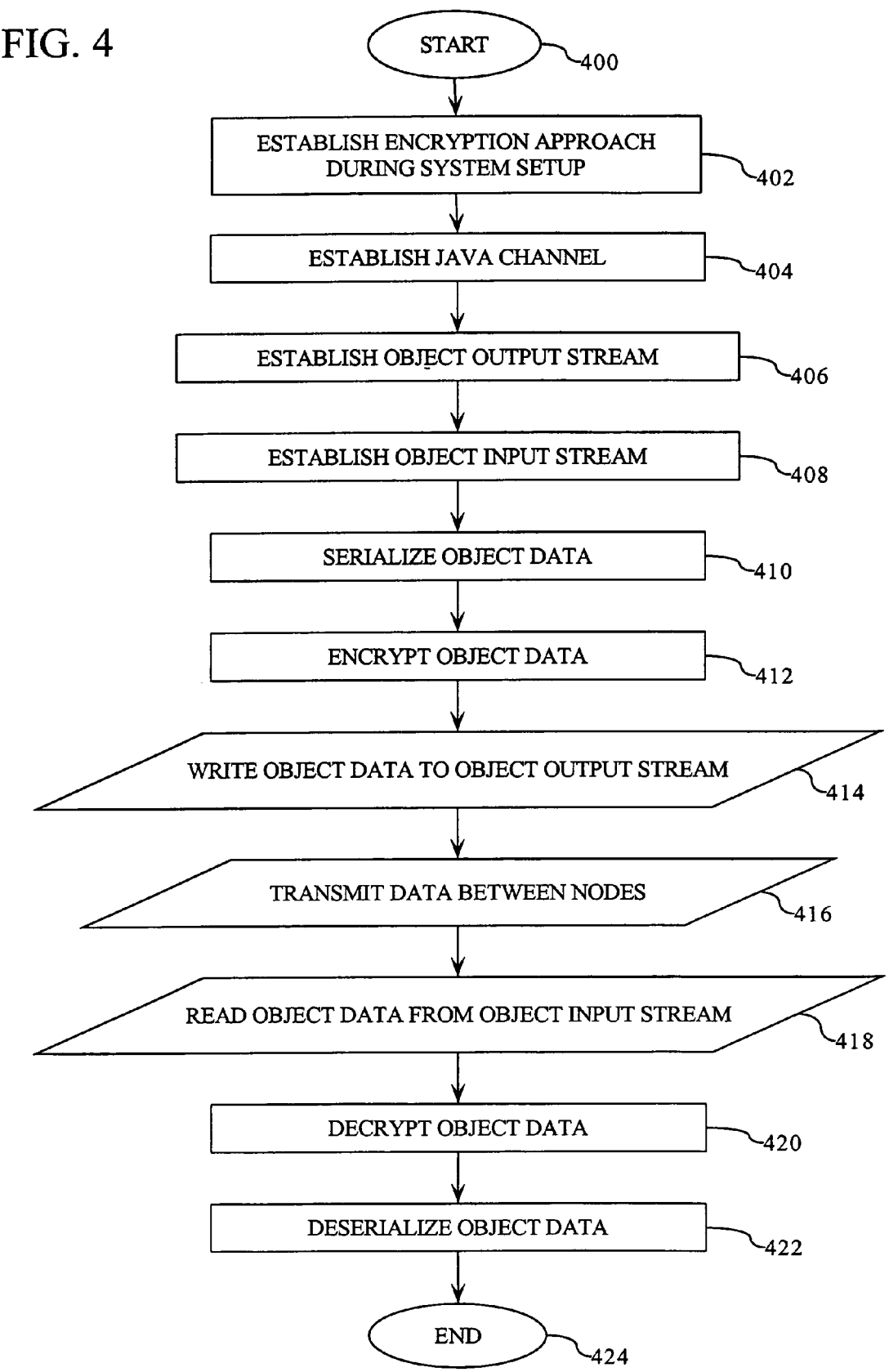
FIG. 4 is a flow chart illustrating a method for providing layer-independent secure communication in a multi-layered communication network according to an embodiment of the invention.

The specific steps for providing layer-independent security of network communication according to an embodiment of the invention are now described with reference to both the block diagram of FIG. 2 and the flow chart of FIG. 4. Generally, the steps are described in the context of an object oriented programming method associated with an object, contained in process 208, which invokes a method associated with a remotely located object contained in process 210. In the non-object oriented context, this is very similar to process 208 issuing a remote procedure call (RPC) to invoke a process remotely located on multi-layered node 204. For purposes of explanation, the data transmitted by the method associated with the object contained in process 208 which invokes the method associated with the remotely located object contained in process 210 is hereinafter referred to as the "object data."

After starting in step 400, in step 402, multi-layered nodes 202, 204 establish an encryption/authentication approach during system setup. Unlike traditional setup negotiation which must be continuously re-negotiated, such as on a per session basis, the agreed upon encryption/authentication approach established between multi-layered nodes 202, 204 only needs to be set up once during system setup, or when either multi-layered node 202, 204 is connected to another node and the security techniques described herein are to be employed with that other node.

In step 404, a Java secure channel 216 is established between node 202 and node 204. According to one embodiment of the invention, Java secure channel 216 is an object class which is defined and invoked by process 208.

In step 406, object output stream 218 is established between process 208 and socket layer 212, and in step 408, object input stream 220 is established between socket layer 214 and process 210. According to one embodiment of the invention, object output stream 218 is an object class defined by process 208 while object input stream 220 is an object class defined by process 210.

In step 410, the object data to be transmitted from process 208 to process 210 is serialized, sometimes referred to as "flattening the object," and then encrypted in step 412 based upon the encryption/authentication approach established in step 402.

In step 414, the object data (serialized and encrypted) is written to object output stream 218, which is received by socket layer 212 and formatted according to socket layer protocol. In step 416, the object data is transmitted from socket layer 212 of multi-layered node 202 to socket layer 214 of multi-layered node 204 over transmission medium 206.

As previously discussed, multi-layered node 202 is illustrated as having a single layer, socket layer 212, while multi-layered node 204 is illustrated as having a single layer, socket layer 214, for purposes of explanation. However, multi-layered nodes 202, 204 may be multi-layered and contain other layers above and below socket layers 212, 214. Consequently, although according to an embodiment of the invention, the object data is transmitted onto transmission medium 206 in the format illustrated in FIG. 3, it is understood that additional formatting of the object data may be performed according to various other communication protocols contained in multi-layered nodes 202, 204. For example, if multi-layered node 202 also supports Internet protocol (IP), then each message (M1, M2 . . . Mn) illustrated in FIG. 3 would also contain IP header information.

After the object data is received by socket layer 214, the object data is read from object input stream 220 by process 210 in step 418. In step 420, the object data is decrypted according to the encryption/authentication approach established in step 402. Then, in step 422, the object data is de-serialized and the method associated with the object remotely located in process 210 is executed. Finally, the process is complete in step 424.

Although embodiments of the invention have been described in the context of encrypting and decrypting object data by processes 208, 210, which are effectively above all of the layers supported by multi-layered nodes 202, 204, respectively, data may be encrypted and decrypted at any layer supported by multi-layered nodes 202, 204, since the encryption of data is performed before the data is written to a stream and is therefore layer-independent.

For example, referring again to FIG. 1, according to another embodiment of the invention, process 108 encrypts data 116 and then writes data 116 to a stream (not illustrated) which is formatted according to the protocol hierarchy 112 and transmitted to multi-layered node 104 on transmission medium 106. Since data 116 was encrypted at the stream level, data 116 may be decrypted at any layer in hierarchy 114, so long as data 116 can be extracted from the data stream. Typically, the size and position of data 116 within a data chunk is known which allows data 116 to be extracted from a data chunk even though the data chunk contains protocol specific information from higher layers. However, if data 116 is encrypted at any other layer in hierarchy 112, then data 116 must first be decrypted at a corresponding layer in hierarchy 114.

Figure 5:
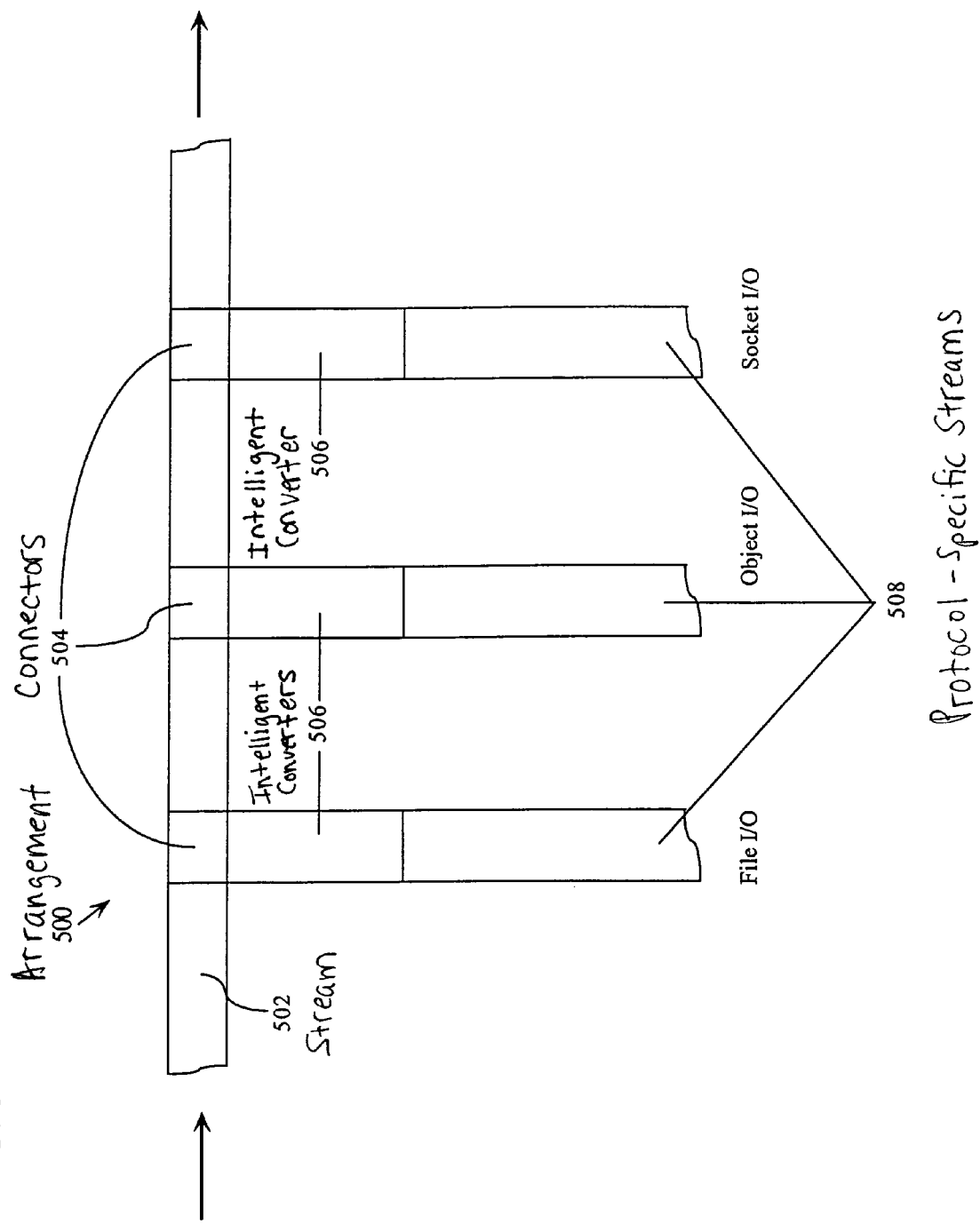
FIG. 5 is a block diagram of a Java secure channel arrangement according to an embodiment of the invention.

According to another embodiment of the invention, a stream is connected to several other protocol-specific streams to support the broadcasting or multi-casting of encrypted information. FIG. 5 illustrates an arrangement 500 which includes a stream 502 according to an embodiment of the invention, connected via connectors 504, to intelligent converters 506, which convert stream 502 into protocol-specific streams 508 such as file I/O, object I/O, and socket I/O streams. Converters 506 have the capability to extract the data portion from stream 502 to support streams 508 at any protocol layer.

According to arrangement 500, any number of protocol-specific streams 508 may be connected to stream 502. In addition, the headers of messages in stream 502 may contain destination-specific encryption/authentication information. For example, stream 502 may contain an encryption/authentication value A, while a recipient of one of the protocol-specific streams 508 holds a key value X, making the decryption of stream 502 a function of A and X (key=f(A,X)). Likewise, similar keys may be developed for the other protocol-specific streams 508.

Hardware Overview

Figure 6:
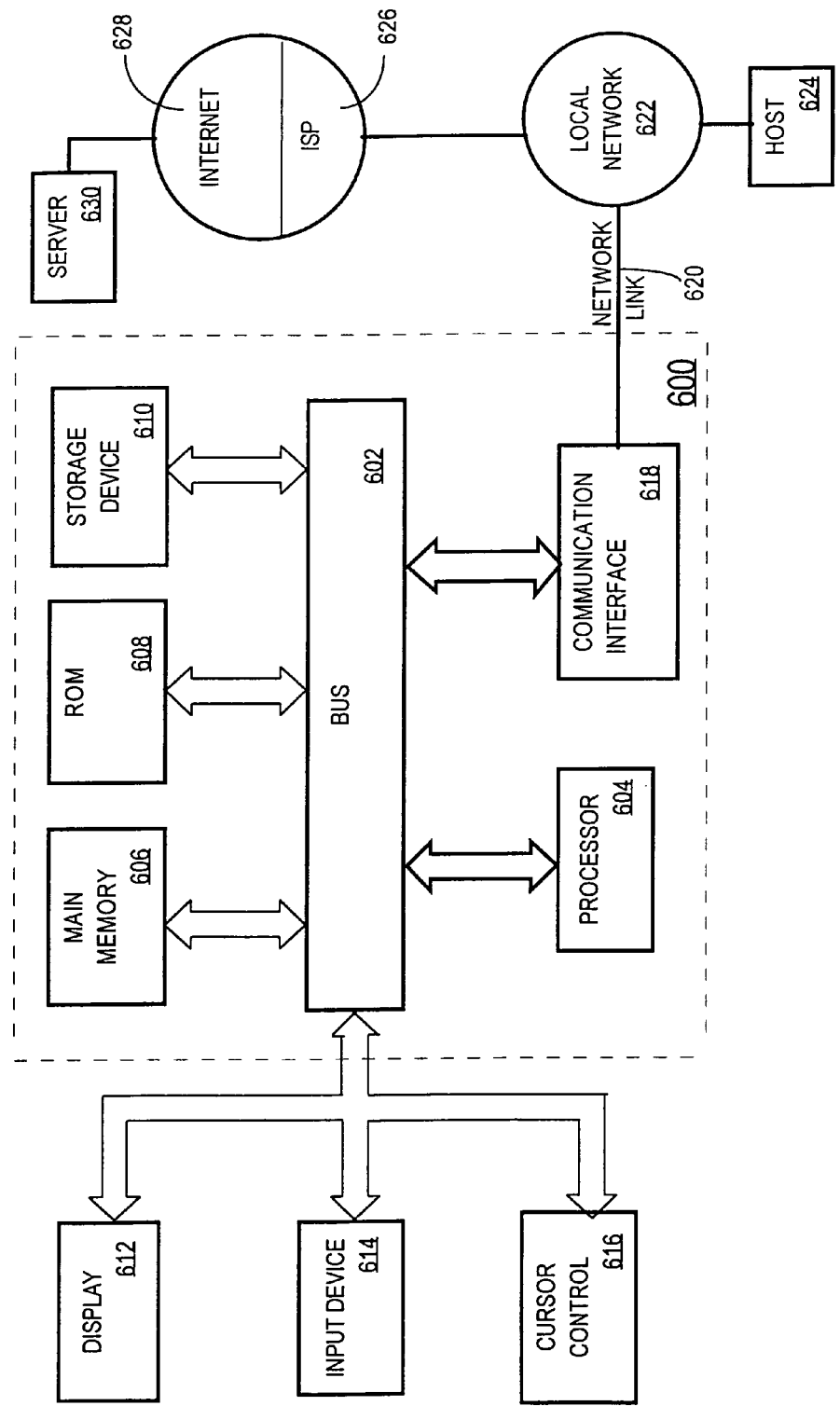
FIG. 6 is a block diagram of an exemplary prior art computer system on which the invention may be implemented and practiced.

FIG. 6 is a block diagram of an exemplary prior art computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Computer system 600 also includes a read only memory (ROM) 608 or other static storage device coupled to bus 602 for storing static information and instructions for processor 604. A storage device 610, such as a magnetic disk or optical disk, is also provided and coupled to bus 602 for storing information and instructions.

Computer system 600 may also be coupled via bus 602 to a display 612, such as a cathode ray tube (CRT), for displaying information to a computer user. An input device 614, including alphanumeric and other keys, is also provided and coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), which allows the device to specify positions in a plane.

The invention is related to the use of computer system 600 to provide layer-independent secure network communication. According to one embodiment of the invention, layer-independent secure network communication is provided by computer system 600 in response to processor 604 executing sequences of instructions contained in main memory 606. Such instructions may be read into main memory 606 from another computer-readable medium, such as storage device 610. However, the computer-readable medium is not limited to devices such as storage device 610. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 606 causes processor 604 to perform the process steps previously described. In alternative embodiments, hard-wired circuitry may be used in place of or in combination with software instructions to implement the invention. Thus, embodiments of the invention are not limited to any specific combination of hardware circuitry and software.

Computer 600 also includes a communication interface 618 coupled to bus 602. Communication interface 608 provides a two-way data communication coupling to a network link 620 to a local network 622. For example, if communication interface 618 is an integrated services digital network (ISDN) card or a modem, communication interface 618 provides a data communication connection to the corresponding type of telephone line. If communication interface 618 is a local area network (LAN) card, communication interface 618 provides a data communication connection to a compatible LAN. Wireless links are also possible. In any such implementation, communication interface 618 sends and receives electrical, electromagnetic or optical signals which carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals which carry digital data streams. The signals through the various networks and the signals on network link 620 and through communication interface 618, which carry the digital data to and from computer 600 are exemplary forms of carrier waves transporting the information.

Computer 600 can send messages and receive data, including program code, through the network(s), network link 620 and communication interface 618. In the Internet example, a server 630 might transmit a requested code for an application program through Internet 628, ISP 626, local network 622 and communication interface 618. In accord with the invention, one such downloaded application provides for the synchronization of threads using selective object locking as described herein.

The received code may be executed by processor 604 as it is received, and/or stored in storage device 610, or other non-volatile storage for later execution. In this manner, computer 600 may obtain application code in the form of a carrier wave.

Although the invention has been described in the context of connection-based communication architectures, the invention is also applicable to sessionless datagram or packet based communication architectures.

The invention provides several advantages over prior approaches for implementing secure network communications. Most importantly, security is implemented using streams which are layer independent. This allows an encrypted stream to be decrypted at any layer without requiring the use of layer specific calls to perform the decryption, which provides greater flexibility than prior approaches. For example, an encrypted stream transmitted by a sending node may be decrypted by a firewall connection at the network (packet) layer having knowledge of the encryption approach negotiated during system setup. Moreover, this approach does not affect existing encryption being carried out at various layers. The approach of the invention avoids the setup negotiation which can significantly degrade communication performance in certain situations.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method for providing communication protocol layer independent security for data transmitted between a first process, executing on a first network node, and a second process, executing on a second network node, wherein the first network node and the second network node each support at least one common communication protocol layer, the method comprising the steps of:
    establishing a Java secure channel between the first network node and the second network node;
    establishing a first Java stream between the first process and the Java secure channel;
    establishing a second Java stream between the second process and the Java secure channel;
    in response to the data being written to the first Java stream, encrypting the data to generate encrypted data, the encrypting of the data being performed independent of any communication protocol layers used to transport the encrypted data from the first network node to the second network node;
    causing the encrypted data to be transmitted from the first network node to the second network node according to the at least one communication protocol layer supported by the first and second network nodes; and
    in response to the encrypted data being read from the second Java stream, decrypting the encrypted data to recover decrypted data which is identical to the data on the first network node before the data was written to the first Java stream, the decrypting of the encrypted data being performed independent of any communication protocol layers used to transport the encrypted data from the first network node to the second network node.

2. The method of claim 1, further including the steps of
    performing a communication protocol layer specific encryption of data to be sent across the communication channel at the first network node, and
    performing a communication protocol layer specific decryption of data received from the communication channel at the second network node.

3. The method of claim 1,
    wherein the method further comprises the step of connecting the Java secure channel to a third Java stream, and
    wherein the third Java stream provides for the transmission of data according to a specific communication protocol layer.

4. A non-transitory computer-readable medium carrying one or more sequences of one or more instructions for providing communication protocol layer independent security for data transmitted between a first process, executing on a first network node, and a second process, executing on a second network node, wherein the first network node and the second network node each support at least one common communication protocol layer, the one or more sequences of one or more instructions including instructions which, when executed by one or more processors, cause the one or more processors to perform the steps of:
    establishing a Java secure channel between the first network node and the second network node;
    establishing a first Java stream between the first process and the Java secure channel;
    establishing a second Java stream between the second process and the Java secure channel;
    in response to the data being written to the first Java stream, encrypting the data to generate encrypted data, the encrypting of the data being performed independent of any communication protocol layers used to transport the encrypted data from the first network node to the second network node;
    causing the encrypted data to be transmitted from the first network node to the second network node according to the at least one communication protocol layer supported by the first and second network nodes; and
    in response to the encrypted data being read from the second Java stream, decrypting the encrypted data to recover decrypted data which is identical to the data on the first network node before the data was written to the first stream, the decrypting of the encrypted data being performed independent of any communication protocol layers used to transport the encrypted data from the first network node to the second network node.

5. The non-transitory computer-readable medium of claim 4, wherein the non-transitory computer-readable medium further includes instructions for performing the steps of
    performing a communication protocol layer specific encryption of the data on the first network node, and
    performing a communication protocol layer specific decryption of the data on the second network node.

6. The non-transitory computer-readable medium of claim 4,
    wherein the non-transitory computer-readable medium further includes instructions for connecting the Java secure channel to a third Java stream, and
    wherein the third Java stream provides for the transmission of data according to a specific communication protocol layer.

7. A computer data signal embodied on a non-transitory computer-readable medium and representing sequences of instructions which, when executed by one or more processors, provide communication protocol layer independent security for data transmitted between a first process, executing on a first network node, and a second process, executing on a second network node, according to at least one common communication protocol layer supported by the first and second network nodes, by performing the steps of:

establishing a Java secure channel between the first network node and the second network node;

establishing a first Java stream between the first process and the Java secure channel;

establishing a second Java stream between the second process and the Java secure channel;

in response to the data being written to the first Java stream, encrypting the data to generate encrypted data, the encrypting of the data being performed independent of any communication protocol layers used to transport the encrypted data from the first network node to the second network node;

causing the encrypted data to be transmitted from the first network node to the second network node according to the at least one communication protocol layer supported by the first and second network nodes; and in response to the encrypted data being read from the second Java stream, decrypting the encrypted data to recover decrypted data which is identical to the data on the first network node before the data was written to the first Java stream, the decrypting of the encrypted data being performed independent of any communication protocol layers used to transport the encrypted data from the first network node to the second network node.

8. The computer data signal of claim 7, wherein the computer sequence of instructions further includes instructions for performing the steps of performing a communication protocol layer specific encryption of the data on the first network node, and performing a communication protocol layer specific decryption of the data on the second network node.

9. The computer data signal of claim 7, wherein the computer sequence of instructions further includes instructions for connecting the Java secure channel to a third Java stream, and wherein the third Java stream provides for the transmission of data according to a specific communication protocol layer.

10. A method for providing communication protocol layer independent security for data transmitted by a process executing on a network node, the method comprising the steps of:

a) establishing a first Java stream between the process and a Java secure channel; and b) in response to the data being written to the first Java stream, encrypting the data to generate encrypted data, the encrypting of the data being performed independent of any communication protocol layers used to transport the encrypted data on the Java secure channel.

11. The method of claim 10, wherein the method further comprises the step of connecting the Java secure channel to a second Java stream, and wherein the second Java stream provides for the transmission of data according to a specific communication protocol layer.

12. A method for providing communication protocol-independent security for data transmitted between a first node and a second node, the method comprising the steps of:

establishing a Java secure channel between a first network node and a second network node;

establishing a first Java stream from a first process to the Java secure channel after the establishment of the Java secure channel, wherein the first Java stream is encrypted after the first process and before entering the Java secure channel and the encrypted first Java stream is independent of any communication protocol layers; and establishing a second Java stream from the Java secure channel to a second process after the establishment of the Java secure channel, wherein the second Java stream is decrypted after the Java secure channel and before entering the second process.

13. The method of clam 12, further comprising connecting the Java secure channel to a third Java stream, wherein the third Java stream provides for the transmission of data according to a specific communication protocol layer.

14. A non-transitory computer-readable medium carrying one or more sequences of one or more instructions for providing communication protocol-layer independent security for data transmitted between a first node and a second node, the one or more sequences of one or more instructions including instructions which, when executed by one or more processors, cause the one or more processors to perform the steps of:

establishing a Java secure channel between a first network node and a second network node;

establishing a first Java stream from a first process to the Java secure channel after the establishment of the Java secure channel, wherein the first Java stream is encrypted after the first process and before entering the Java secure channel and the encrypted first Java stream is independent of any communication protocol layers; and establishing a second Java stream from the Java secure channel to a second process after the establishing of the Java secure channel, wherein the second Java stream is decrypted after the Java secure channel and before entering the second process.

15. The non-transitory computer-readable medium of claim 14, wherein the non-transitory computer-readable medium further includes instructions for:

connecting the Java secure channel to a third Java stream, wherein the third Java stream provides for the transmission of data according to a specific communication protocol layer.

16. A communications network providing communication protocol-independent security for data, comprising:

a first network node;

a second network node;

a Java secure channel between the first network node and the second network node;

a first Java stream between a first process of the first node and the Java secure channel, wherein the first process encrypts the first Java stream independent of any communication protocol layers; and a second Java stream between the Java secure channel and a second process of the second node, wherein the second process decrypts the second Java stream.

17. The communication network of claim 16, wherein at least one of the encryption of the first stream and the decryption of the second stream is specific to a communication protocol layer.

18. The communication network of claim 16, further comprising a third Java stream that provides for the transmission of data according to a specific communication protocol layer.

19. A computer data signal embodied in a non-transitory computer-readable medium and representing sequences of instructions which, when executed by one or more processors, provide communication protocol independent security for data transmitted between a first node and second node, by performing the steps of:

establishing a Java secure channel between a first network node and a second network node;

establishing a first Java stream from a first process to the Java secure channel after the establishment of the Java secure channel, wherein the first Java stream is encrypted after the first process and before entering the Java secure channel and the encrypted first Java stream is independent of any communication protocol layers; and establishing a second Java stream from the Java secure channel to a second process after the establishment of the Java secure channel, wherein the second Java stream is decrypted after the Java secure channel and before entering the second process.

20. The computer data signal of claim 19, wherein the computer sequence of instructions further includes instructions for:

connecting the Java secure channel to a third Java stream, wherein the third Java stream provides for the transmission of data according to a specific communication protocol layer.

* * * * *